United States Patent [19]
Poppe et al.

[15] 3,663,260
[45] May 16, 1972

[54] TALC FILLED METALLIZABLE POLYOLEFINS

[72] Inventors: Wassily Poppe, Lombard, Ill.; Habet M. Khelghatian, Springfield; Anthony J. Lutz, Jr., Chester, both of Pa.

[73] Assignee: Standard Oil Company, Chicago, Ill.

[22] Filed: July 20, 1970

[21] Appl. No.: 56,724

[52] U.S. Cl. .................. 117/47 A, 106/306, 117/138.8 E, 204/30
[51] Int. Cl. ............................................. C23b 5/62
[58] Field of Search .............. 106/241, 306; 117/138.8 E, 117/47 A; 204/20, 30; 260/756, 765

[56] References Cited

UNITED STATES PATENTS 3,567,594 3/1971 Wells ........................... 204/20
3,157,614 11/1964 Fischer ......................... 260/765

*Primary Examiner*—John H. Mack
*Assistant Examiner*—W. I. Solomon
*Attorney*—Roger V. N. Powelson, Arthur G. Gilkes, Charles E. Feeny and John C. Martin, Jr.

[57] ABSTRACT

Metallizable polyolefin compositions are provided by incorporating into a polyolefin from about 1 percent to about 50 percent by weight, based on the weight of the polyolefin, of a finely-divided talc having a platey (micaceous) or massive (granular) particle shape and having an average particle size of from about 0.4 microns to about 40 microns. The aforementioned talc filled polyolefin compositions may be metallized by electroplating or other metallizing processes to form metallized shaped articles.

9 Claims, No Drawings

TALC FILLED METALLIZABLE POLYOLEFINS

BACKGROUND OF THE INVENTION

This invention provides for polyolefin compositions that may be metallized by electroplating or other metallizing processes to obtain metallized shaped articles having a wide variety of industrial uses in the automotive, appliance, plumbing, electronic and other industries. Recently there has been increased commercial interest in electroplating polyolefins, especially in view of advances in technology which have provided means for accomplishing a firm bond between the metal layer and the polyolefin base member. However, it has been difficult to incorporate various fillers into electroplatable polyolefins for such purposes as improving stiffness and flexural properties and also obtain an electroplated article having a smooth surface appearance as determined by visual observance. Although the particular reasons for failure to obtain an eye-pleasing appearance are not precisely known, it appears that the rough surface is attributable to the acid etch bath of conventional electroplating processes. Another disadvantage of electroplatable polyolefin compositions that do not contain a filler is that larger molded objects suffer warpage and other deleterious effects during the plating process. Warpage is generally defined as any dimensional distortion in a plastic object from its designed dimensions after molding or other fabrication.

Talc filled polyolefins are known in the art and U. S. Patent 3,157,614 describes polyolefin compositions containing certain talcs that improve dielectric strength.

SUMMARY OF THE INVENTION

It is the object of this invention to provide certain talc filled metallizable polyolefin compositions that may be metallized to obtain a smooth surface appearance. It is a further object of this invention to provide certain talc filled metallizable polyolefin compositions that may be electroplated to obtain plated articles substantially free of warpage. It is still a further object of this invention to provide certain talc filled polyolefin compositions that may be molded to obtain platable articles having improved flexural modulus. A further object of this invention is to provide a process for preparing an electroplatable polyolefin composition.

These and other objects of this invention are accomplished by incorporating into a metallizable polyolefin from about 1 percent to about 50 percent, generally about 10 percent to about 40 percent and most preferably from about 15 percent to about 30 percent by weight, based on the weight of the polyolefin, of talc having a platey (micaceous) or a massive (granular) particle shape and having an average particle size varying from about 0.4 microns to about 40 microns and generally varying from about 2 microns to about 20 microns and most preferably the talc particle size varies from about 2 microns to about 10 microns.

DESCRIPTION OF THE INVENTION

The polyolefins useful in this invention include polymers which contain a major proportion (i.e., greater than 50 percent and generally greater than about 80 percent) of an aliphatic olefin, having from two to eight carbon atoms. Such normally solid polyolefins, therefore, include polyethylene, polypropylene, ethylene propylene block or random copolymers, ethylene butene-1 block or random copolymers, polybutene-1, poly(4-methylpentene-1), poly(3-methylbutene-1), and the like. The term polyolefin as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. Particularly useful polyolefins are those that are substantially crystalline polymers such as substantially crystalline polypropylene, derived from 1-alkenes having from three to eight carbon atoms i.e., polymers containing at least 25 percent, and preferably at least 50 percent crystallinity as determined by density-crystallinity relationships, a type of technique described by J. A. Gailey et al. SPE Technical Papers (ANTEC), Vol. IX, Session IV-1, pages 1 to 4, Feb. 1963.

Pure talc mineral is characterized by softness (a rating of 1 on the Mohs mineral hardness scale), hydrophobic surface properties and slippery feel. The various crystal forms have been described as foliated, fibrous, massive, granular, platey, micaceous or lamellar. Fibrous or foliated talc are extremely soft in texture and usually contain short fibrous particles. These talcs as well as talc having needlelike crystals are unsuitable for this invention. On the other hand, talc having a platey, micaceous or lamellar crystal form (all of which have a platey particle shape) as well as talc having a massive or granular particle shape are particularly well suited for this invention. The amount of talc incorporated into the polyolefin may vary from about 1 percent to about 50 percent, but generally ranges from about 10 percent to about 40 percent and most preferably from about 15 percent to about 30 percent. The particle size of the talc is another important parameter and the average particle size may vary from about 0.4 microns to about 40 microns but generally ranges from about 2 microns to about 20 microns and most preferably ranges from about 2 microns to about 10 microns.

The incorporation of platey (micaceous or lamellar) and massive (granular) talc into electroplatable polyolefins provide many advantages. For instance, the flexural modulus and stiffness properties of the talc filled electroplatable polyolefin are substantially improved. Additionally, the electroplated polyolefin articles, particularly larger pieces, are essentially free of warpage as determined by visual observance. Generally, warpage results from either nonuniform distribution of resin and filler or a temperature difference on opposite sides of the molding or the particular design of parts having a curved surface wherein the curved surface tends to shrink to a curvature of shorter radius as the molded object cures and cools. As a result of warpage the plastic article may exhibit a "dished" or "domed" effect. The former effect defines a symmetrical distortion of a flat or curved section of a plastic object so that, as normally viewed, it appears concave. The latter effect defines the distortion so that the object appears convex. However, the warpage exhibited by electroplated polyolefin articles wherein the polyolefin substrate does not contain a filler is not caused by conventional reasons but is the result of treating the polyolefin substrate to an electroplating process.

The metallizable polyolefin compositions may optionally contain a compatible adhesion-promoting modifier such as a polyterpene resin, a rosin or rosin derivative or a petroleum resin having a molecular weight less than about 3,000. Suitable rosin derivatives include rosin metal salts (metal resinates), rosin acids, ester gums, disproportionated rosin, polymerized rosin, hydrogenated rosin, etc. Metallizable polyolefins containing various adhesion-promoting modifiers are described in such patents as Belgian Patent 733,739 and U. S. Pat. application, Ser. No. 789,422 filed Jan. 6, 1969 now U.S. Pat. No. 3,567,487. The technical descriptions in these patents are hereby incorporated into this disclosure.

Other optional additives that may be incorporated into the polyolefin compositions include various antioxidants, stabilizers, fillers, nucleating agents and the like.

The polyolefin and the finely-divided talc filler together with other additives such as an adhesion-promoting modifier may be blended by conventional techniques. For instance, the polyolefin and additives may be melt blended and mechanically stirred in such equipment as extruders, stirred mixers or milling rolls and then formed, with cooling, into molded, shaped articles that may subsequently be metallized. Also the polyolefin and additives in pulverulent form may be dry blended. Following blending, the composition is prepared for a molding or melt-extrusion procedure and a shaping and cooling technique.

The electroplatable polyolefins of the present invention are shaped into the article desired to be metallized by any of the means heretofore employed for the preparation of such articles inclusive of which are compression molding and injection molding.

Although a variety of processes have been developed for the metallizing of non-conductive surfaces and in particular, plastics, electroplating and vacuum metallizing are the most common. Although various commercial processes are employed to electroplate a non-conductive substrate, the same general steps are usually employed and these involve conditioning the base member, sensitizing, activating, apply an electroless copper conductor and thereafter electroplating a finish metal to the polyolefin base member. Thus, the plating of articles made from the modified polyolefins of the present invention is generally conducted using the following steps:

1. The surface to be plated is cleaned using a mild alkaline bath to remove oils, mold release agents and fingerprints.
2. The alkaline material retained by the surface is neutralized using a mild acid.
3. The clean surface is then chemically etched with a conditioner containing concentrated mineral acid such as sulfuric acid and chromic trioxide or a chromate.
4. The resulting etched surface is sensitized with a readily oxidizable tin salt solution such as stannous chloride which causes tin to be absorbed on the surface.
5. The surface is then activated or nucleated by treatment with an aqueous solution of a noble metal salt such as palladium chloride which forms a metallic film at discrete activated sites. 6. The activated surface is subjected to electroless plating using copper, nickel, or cobalt as the metal. This is accomplished by immersing a treated surface in a solution of such metal salt containing in addition to the metal salt such as copper sulfate or nickel chloride, a reducing agent such as formaldehyde, trioxymethylene and the like. Sufficient copper, nickel or cobalt is deposited on the surface of the polyolefin article to achieve a continuous coating capable of conducting electricity.
7. The electrodeposition of metal is then followed by conventionally plating of the surface with a finish metal such as copper, nickel and/or chromium or just nickel and chromium. The thickness of the electroplated coating is generally within the range of 0.1 to 1.5 mil.

It is, furthermore, highly desirable if not essential to rinse and clean the surface being treated with water between each of the steps outlined and in some instances, it may also be desirable to dry the surface between the various treating steps. Since the various outlined steps employed in the electroplating of non-conducting surfaces and particularly plastic surfaces are well known in the electroplating art, no further description is deemed necessary for a full understanding of the present invention. The polyolefin compositions of the present invention can be employed in electroplating using any of the processes heretofore developed for electroplating polyolefin surfaces. The electroplating procedure described in French Pat. No. 1,564,631 may be employed to metallize polyolefin substrates that do not contain the aforementioned adhesion-promoting modifiers.

Alternatively, a metallic coating may be applied to the polyolefin base member by vacuum metallizing. This well known and conventional procedure involves the principle of evaporation of metals under high vacuum. Representative of typical metals that may be applied using this technique include aluminum, copper and silver. Generally, vacuum metallizing involves the steps of (a) applying a suitable undercoat or prime coat to the polyolefin article, (b) evaporating the desired metal under high vacuum, and (c) applying a topcoat lacquer to protect the thin metallic deposit. Suitable undercoats that are applied to the polyolefin article are well known and are generally a dispersion or solution of an acid containing polymer such as carboxylated butadiene polymers, and maleic anhydride modified atactic polypropylene polymers. As the topcoat, any commercially available thermosetting acrylic lacquer may be used. The deposited metal film is thin and opaque, ranging from thicknesses of 0.15 micron to 1.0 micron.

Although the adhesion of metal plate to the substrate can be measured by various tests, bond strength is preferably measured by the pull test in which two parallel cuts are made into the plated metal coating, one-half inch apart and an additional vertical cut is made to form a tab; one end of the resulting tab then being raised sufficiently to allow gripping by a tensile testing machine; the specimen is then placed into a tensile rig and the tab is pulled vertically from the surface. The force required to pull the tab is measured as the bond strength. For most applications a bond strength of 6 to 10 lbs/in. is adequate, but if the plated article in use is to be subjected to mechanical shock or extremes of temperature, bond strengths up to 25 lbs/in. or more may be desirable.

For purposes of illustrating the invention, the following examples are provided wherein, unless otherwise indicated, all parts and percentages are by weight:

EXAMPLE 1

A polymer composition is prepared by blending 74 parts of a crystalline polypropylene homopolymer having a flow rate of about 3.5 (ASTM-D-1238-62T), 0.25 parts of dilauryl thiodipropionate, 0.25 parts of 2,6-ditertiary butyl 4-methyl phenol, 0.15 parts of calcium stearate, 0.35 parts of t-octylphenoxy-polyethoxyethanol having an average number of 9 to 10 ethoxy units, 5 parts of $TiO_2$, 5 parts of limed rosin (an adhesion-promoting modifier) having a softening point (Ring and Ball) of 145°–155° C., and an acid number of 60–70, and 15 parts of a finely-divided platey talc having an average particle size of 5.1 microns. The ingredients were dry blended at room temperature for 1-½ hours and then melt extruded and ground into molding powder. Plaques, 5 inches × 5 inches × 110 mil, were injection molded by conventional apparatus. Measurement of the flexural modulus (ASTM-D-790-66) of the molded plaque gave a value of 254,000 p.s.i. In addition to the improved flexural modulus the molded plaques had a glossy surface appearance.

The plaques were then immersed consecutively in a conditioner consisting of 55 percent sulfuric acid (96 percent concentration), 10 percent potassium dichromate and 35 percent water for a period of about 6 minutes at 80° C.; in a stannous chloride sensitizer solution containing per liter of solution 10 g. of $SnCl_2$ and 40 ml of HCl at ambient temperatures of 1 to 3 minutes; in an activator solution containing per gallon of solution 1 g. of palladium chloride and 10 ml of HCl for a period of 1 to 2 minutes at ambient temperatures; and in an electroless copper plating solution containing per liter of solution 29 g. of copper sulfate, 140 g. of Rochelle Salt, 40 g. of sodium hydroxide and 166 g. of formaldehyde (37% solution) at a temperature of 70° C. for a period sufficient to obtain a continuous coating capable of conducting electricity. Between each of the immersions described, the plaque is thoroughly rinsed with distilled water. The resulting plaque on washing with water was then electroplated with copper for about 20 minutes, at a current density of approximately 30 amps/sq. ft., resulting in about a 1 mil coating of copper on the plaque.

The bond strength of the electroplated metal to the polypropylene substrate was measured by the previously described bond strength test and the results averaged about 20 lbs/in. The plaques appeared warp-free as determined by the unaided eye and the surface was smooth and free of surface defects.

EXAMPLE 2

Example 1 was repeated using the same materials in the same proportions with the exception that the talc was a finely-divided platey type American Ground Italian Talc (01615 AGIT, available from Whittaker, Clark & Daniels, Inc., New York, New York). The flexural modulus of a molded plaque was 258,000 p.s.i. After the plaques were electroplated according to the procedure of Example 1, the average bond strength exceeded 25 lbs./in. Furthermore, there was no visible warpage of the electroplated plaques.

Example 3

Example 1 was again repeated with the exception that the talc filler was a magnesium silicate (chemical analysis: 60 percent silica, 32 percent magnesium oxide, 2 percent aluminum oxide, 0.4 percent calcium oxide, 1 percent water solubles and a loss of ignition of 3 percent to 5 percent) having a platey particle shape, an average particle size of 2 to 3 microns and an oil absorption (Gardner-Coleman) of 50.0. The flexural modulus of a molded plaque was 259,000 p.s.i. Following electroplating according to the procedure of Example 1, the bond strength averaged about 15 lbs./in. Again no visible warpage was observed and the plated plaque was smooth and free of surface defects.

EXAMPLE 4

Example 2 was repeated except that the titanium dioxide ($TiO_2$) was omitted and 20 parts of the same talc were employed. The flexural modulus of a molded plaque was 271,000 p.s.i. The bond strength of the electroplated plaques averaged in excess of 26 lbs./in. No warpage of the electroplated plaque was observed and again a smooth surface was obtained.

EXAMPLE 5

Example 3 was repeated except that the titanium dioxide was again omitted and 20 parts of the same talc were compounded into the polypropylene. The flexural modulus of a molded plaque was 276,000 p.s.i. After electroplating, according to the procedure of Example 1, the bond strength averaged about 13 lbs./in. Again no warpage of the electroplated plaque was observed and a smooth, defect-free surface was obtained.

CONTROLS

For purposes of comparison, Example 1 was repeated except that the talc filler was omitted and the amount of polypropylene was increased to 89 parts. The flexural modulus of a molded plaque measured 188,000 p.s.i. The bond strength, after electroplating according to the procedure of Example 1, was about 18 lbs./in. However, warpage occurred and the electroplated polypropylene plaque exhibited a noticeable "domed" effect.

The Control was repeated using the same polyolefin composition but a larger molded article was fabricated. Warpage of the electroplated article was more pronounced and the article would not be commercially useful.

In a third Control, Example 1 was repeated except that the talc filler was Desertalc 57, a talc containing a significant quantity of particles having long, needlelike crystals. The surface appearance of an electroplated plaque was rough and unappealing to the eye. Since the metal finish lacked smoothness and was covered with surface defects, an electroplated polyolefin article containing this type of talc would be commercially unacceptable as a decorative material.

The above examples and Controls illustrate the superiority of the talc fillers useful in this invention. The useful talcs consist essentially of particle shapes having a platey (micaceous) or massive (granular) crystal form and must be essentially free of talc having fibrous or needlelike crystals. Additionally, the average particle size of the talc may vary from about 0.4 microns to about 40 microns.

We claim:

1. A metallized polyolefin shaped article comprising a metallizable polyolefin base member and a superimposed metal layer, said polyolefin base member containing from about 1 percent to about 50 percent by weight, based on the weight of the polyolefin, of talc having a platey or massive particle shape and an average particle size of from about 0.4 microns to about 40 microns.

2. A metallized article according to claim 1 wherein said polyolefin base member additionally contains an adhesion-promoting modifier selected from the group consisting of rosin and rosin derivatives.

3. A metallized article according to claim 1 wherein the amount of talc is from about 10 percent to a about 40 percent and the average particle size is from about 2 microns to about 20 microns.

4. A metallized article according to claim 1 wherein said polyolefin is a substantially crystalline polypropylene, wherein the amount of talc is from about 15 percent to about 30 percent and wherein the average particle size of said talc is from about 2 microns to about 10 microns.

5. A metallized article according to claim 1 wherein said polyolefin is a substantially crystalline propylene polymer.

6. A metallized article according to claim 5 wherein the average particle size of said talc is from about 2 microns to about 20 microns.

7. In a process for preparing an electroplatable polyolefin composition wherein said composition is subsequently plated to form a metallized shaped article having a polyolefin base member and a superimposed metal layer, the improvement of incorporating into said polyolefin composition from about 1 percent to about 50 percent by weight, based on the weight of the polyolefin, of talc having a platey or massive particle shape and having an average particle size of from about 0.4 microns to about 40 microns.

8. A process according to claim 7 wherein the amount of said talc is from about 10 percent to about 40 percent.

9. A process according to claim 7 wherein said polyolefin is a, substantially crystalline polypropylene and wherein the particle size of said talc is from about 2 microns to about 20 microns.

* * * * *